Figure 1:
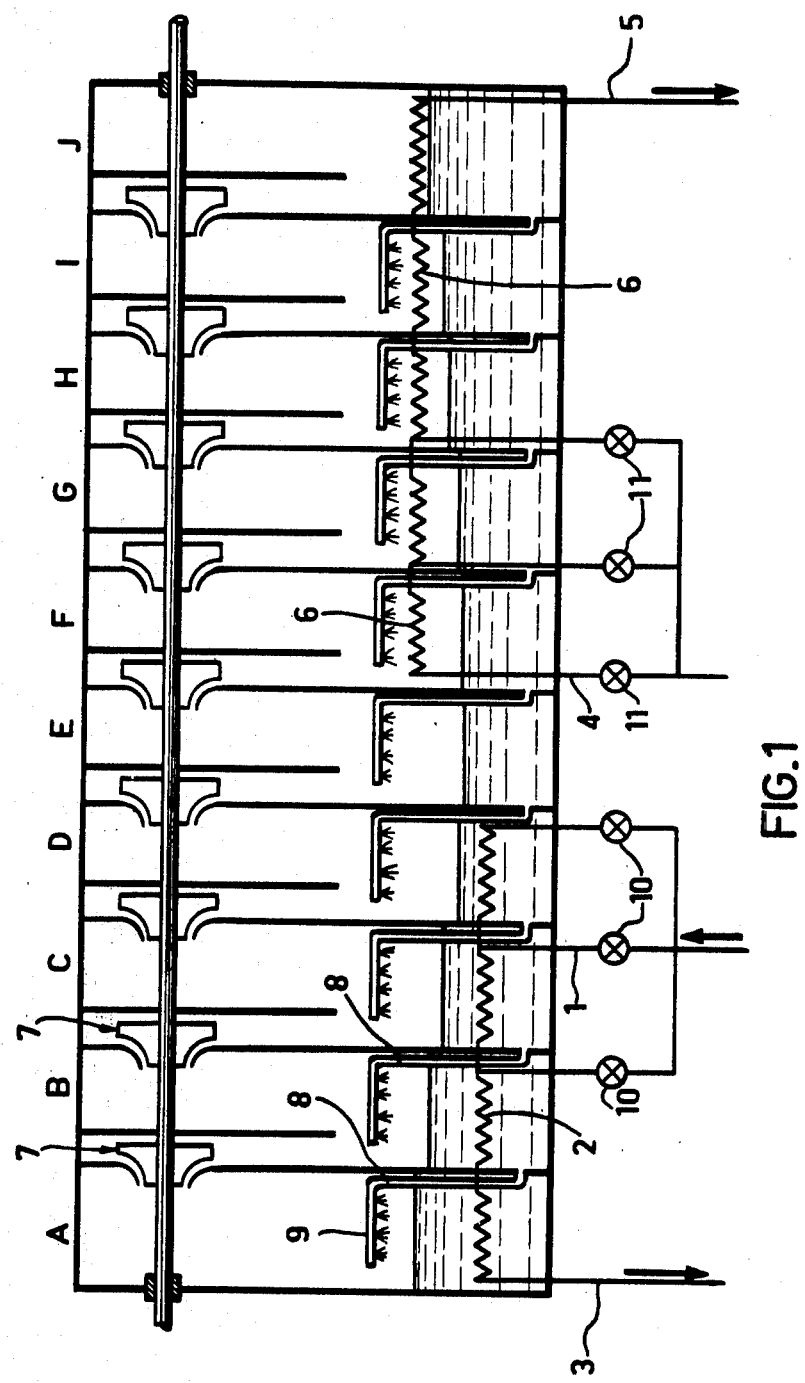

United States Patent [19]

Sterlini

[11] 4,149,585

[45] Apr. 17, 1979

[54] PROCESS AND APPARATUS FOR HEAT EXCHANGE BETWEEN FLUIDS

[75] Inventor: Jacques Sterlini, Paris, France

[73] Assignee: CEM-Compagnie Electro-Mecanique, Paris, France

[21] Appl. No.: 795,566

[22] Filed: May 10, 1977

[30] Foreign Application Priority Data

May 18, 1976 [FR] France .................................. 76 14965

[51] Int. Cl.² ............................ F28C 3/08; F25B 7/00; F25B 1/10
[52] U.S. Cl. .......................................... 165/1; 62/79; 62/335; 62/510
[58] Field of Search ............... 62/79, 175, 196 A, 335, 62/510; 165/1

[56] References Cited

U.S. PATENT DOCUMENTS

| | | | |
|---|---|---|---|
| 3,092,976 | 6/1963 | Hashemi-Tafreshi | 62/335 X |
| 3,306,346 | 2/1967 | Othmer | 62/335 X |

*Primary Examiner*—Carlton R. Croyle
*Assistant Examiner*—Leonard E. Smith
*Attorney, Agent, or Firm*—Burns, Doane, Swecker & Mathis

[57] ABSTRACT

The present invention, which relates to a method and equipment for transferring heat between fluids, involves the combination of a multi-stage compressor with a series of heat-exchangers. The vapor of a condensable fluid is transmitted from one exchanger to the next by passing the same through a compressor stage, the condensate returning by direct passage with flash effect. A fluid to be cooled gives up its heat within the exchangers to the condensable fluid which is progressively vaporized.

The equipment may be completed by a symmetrical part in which the condensable fluid gives up its heat of condensation to a third fluid.

The invention is applicable to the use of low-level temperature heats, e.g., of geothermal origin.

17 Claims, 3 Drawing Figures

PROCESS AND APPARATUS FOR HEAT EXCHANGE BETWEEN FLUIDS

This invention relates to a method of, and equipment for, transferring heat between fluids, in particular to a method and equipment for pumping heat.

A method and equipment already have been proposed for transferring latent heat available in the form of low-level temperature condensing vapors by transfer to a heat-carrying liquid by raising the temperature. This method is the object of a patent application filed in France on 11 Apr. 1975 under Ser. No. 7511438.

In that instance the equipment was meant more particularly to be used in a facility supplied with the latent heat from a condensing vapor, in particular ammonia vapor.

It is frequently the case that sensible heat available at low level in a liquid must be transferred to another heat-carrying fluid. This happens in particular if a brine of geothermal origin is available, the heat of which is to be transferred to a utilization circuit.

The object of the present invention is a method of and equipment for carrying out this transfer with maximum efficiency. A further inventive object is to provide a method and heat-exchange system in which the heat from a first fluid is used to make a second fluid (for instance, ammonia) in the liquid state pass into the state of a saturated vapor.

As regards one method of the invention, the two fluids may be transformed in a set of modules each comprising one stage of a multi-stage compressor and one heat-exchanger connected to the high-pressure output of said compressor, the first fluid traversing in series the heat-exchangers of said modules in the direction of decreasing pressures prevailing in the compartment of the second fluid, this compartment of the second fluid of the heat-exchanger of each of said modules being fed on one hand with the second fluid in the liquid state from the heat-exchanger of the adjacent module at higher pressure and, on the other hand, with the second fluid in the gaseous state from the adjacent module at lesser pressure, said second fluid upon crossing the compressor stage of said module, and of each of said modules said second fluid is moved on one hand in the liquid stage toward the heat-exchanger of the adjacent module at lesser pressure and on the other hand in the gaseous state to the input of the compressor stage of the adjacent module at higher pressure.

The invention in particular applies to the case where sensible heat is available at low level in a liquid such as a geothermal brine and is desired to be transferred into another liquid such as fresh water by raising this heat's temperature level, that is, if a liquid at temperature $T_1$ is available, it is lowered to $T_0$, and the heat so released is used to heat another liquid originally at a temperature $T_2$ to $T_3$, the mean of temperatures $T_2$ and $T_3$ exceeding that of $T_0$ and $T_1$. In this case three fluids are used, for instance the first one being the geothermal brine, the second being ammonia and the third being fresh water.

In this embodiment of the invention the second fluid, after having been at least partly transformed into saturated vapor, gives up its heat of condensation to a third fluid, whereupon it is recycled, the second and third fluids being moved into a second series of modules each comprising one stage of a multi-stage compressor with a heat-exchanger connected to each high-pressure output, the third fluid passing in series through the exchangers of the modules of this second series in the direction of the increasing pressures prevailing in the compartment of the second fluid, the compartment of the second fluid of the heat-exchanger of each of said modules being fed on one hand with the second fluid in the liquid state from the heat-exchanger of the neighboring module at higher pressure and, on the other hand, with the second fluid in the gaseous state from the neighboring module at lesser pressure and having crossed the compressor-stage of said module, the second fluid being conveyed from the heat-exchanger of each of the modules—on one hand—in the liquid state to the heat-exchanger of the neighboring module at lesser pressure, and, on the other hand, in the gaseous state to the compressor stage of the neighboring module at higher pressure. The modules crossed by the first fluid and those crossed by the third are part of a unique series crossed by the second fluid in the direction of increasing pressure when it is in the gaseous state and in that of decreasing pressures when in the liquid state.

Figure 2:
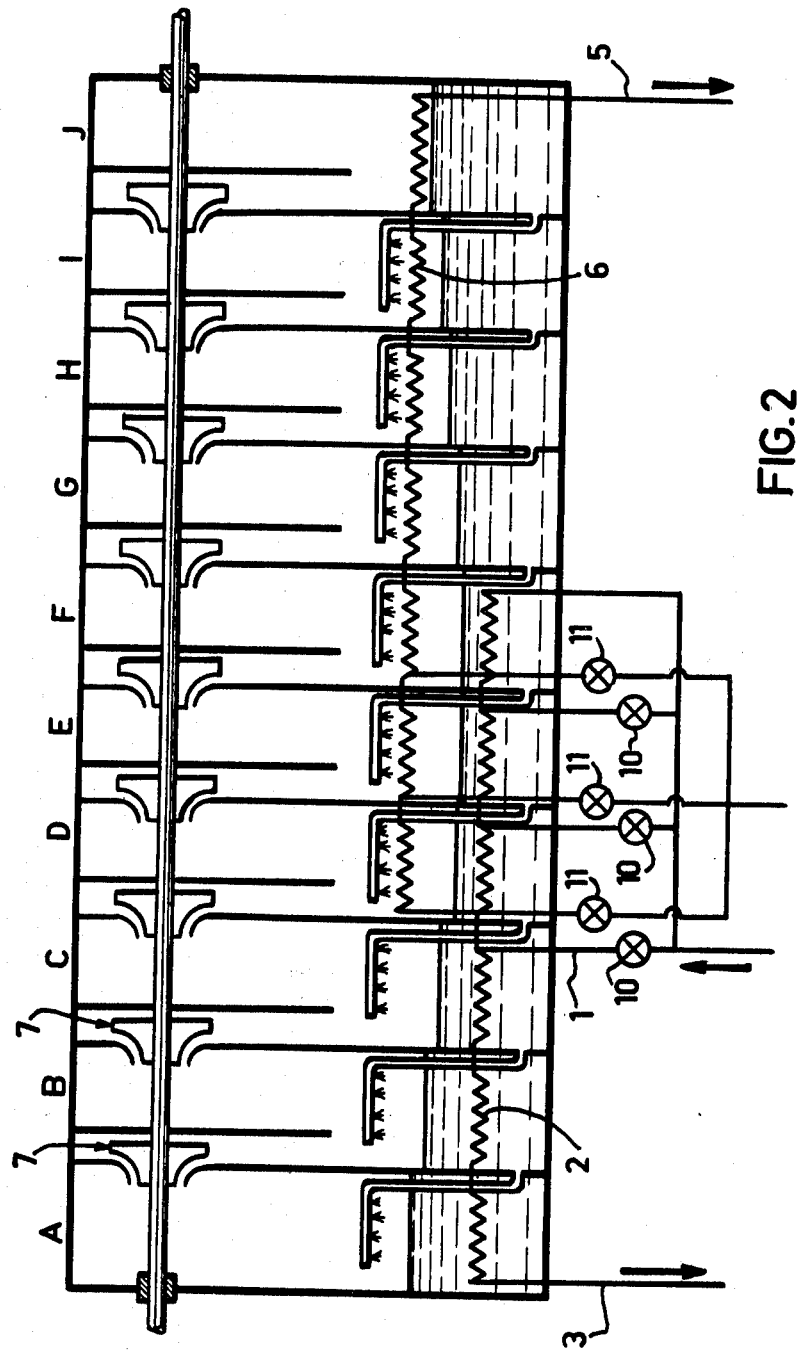

The invention is being described below in greater detail and with reference to a non-limiting embodiment directed particularly to an embodiment for three fluids. The figures of the appertaining drawing show FIG. 1, a diagram of one embodiment of equipment of the invention;

FIG. 2, a diagram of equipment for another embodiment of the invention; and

Figure 3:
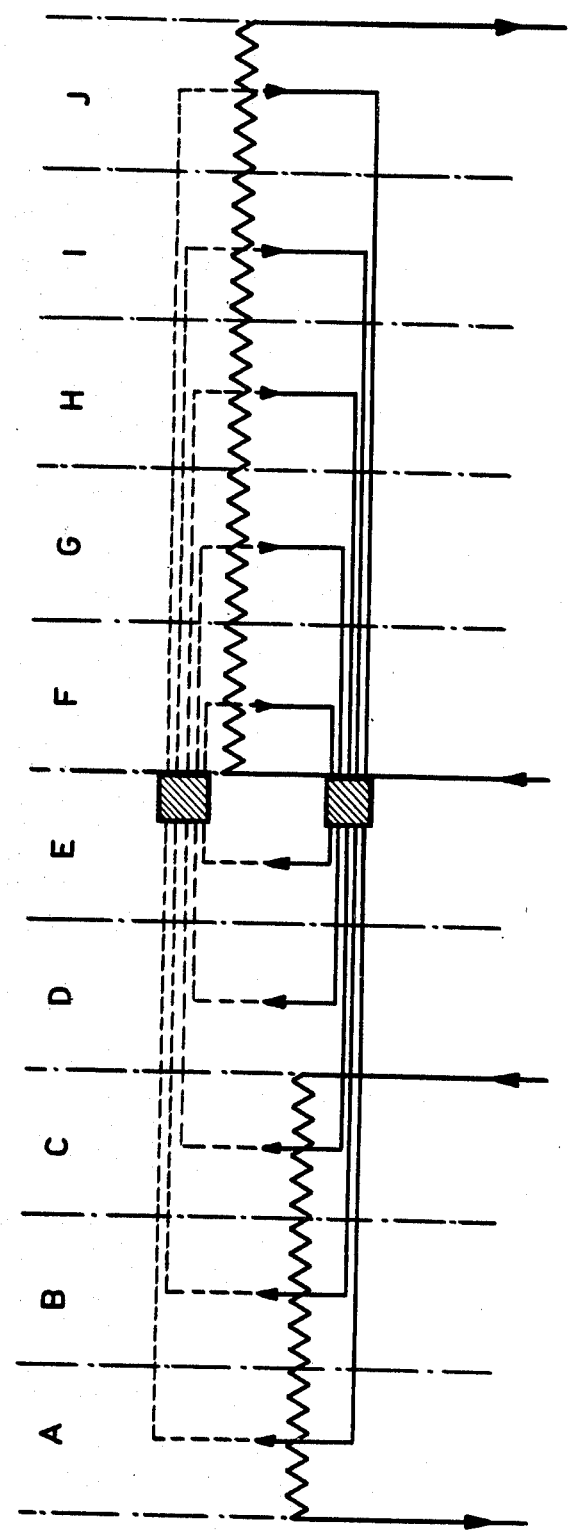

FIG. 3, a theoretical graph of the gas circulation in equipment similar to that of FIG. 1.

The thermodynamic transformations take place in a sequence of elementary series termed "modules" which are staggered in pressure and temperature; by convention, the rank of the modules is take as increasing when moving toward increasing pressures.

A basic module of rank i comprises a compression stage for the vapor of the second fluid (for instance, ammonia) associated with a cell being fed the sum of the vapor flow from the second fluid that has crossed this stage, the cell under consideration communicating with the cells of rank $i+1$ and $i-1$ by means of calibrated orifices, being crossed by a flow of the second liquid fluid in the sense of decreasing rank and also comprised by exchange bundles which may be traversed either by the first fluid (e.g., geothermal brine) circulating in the sense of decreasing rank (in which case the bundles are heating), or by the third fluid (e.g., fresh water) circulating in the sense of increasing rank (in which case the bundles are cooling). The cells in the invention may be spanned simultaneously by heating and by cooling bundles; there may also comprise bundles which are not traversed by exchange fluids, or may even lack bundles. Proper measures are taken in the modules so that permanent flow and transfers of heat and mass between the same fluids may be achieved. In sum, such operations take place in the module of rank i that a flow of vapor of the second fluid from module of rank $i-1$ is received; furthermore, a flow of liquid of the second fluid from module $i+1$, while a flow of vapor of said compressed second fluid and in saturated state is passed to module $i+1$. Furthermore, there is a simultaneous flow of said second fluid towards module $i-1$, the variation in the flow of vapor mass through said module being equal and opposite to the variation of the flow of liquid mass, these variations reflecting the evaporations and condensations of the second fluid, as a whole, in said module.

Preferably, the first fluid obtained from the outside at temperature $T_1$ is introduced into the equipment at the level of the module with the temperature nearest to $T_1$, if possible slightly exceeding $T_1$, and circulates in the bundles, also called heating bundles, while traversing in series the modules in the decreasing direction as far as the modules at temperature $T_0$, leaving the equipment at that temperature. Preferably also, the third fluid obtained from the outside at temperature $T_2$ is introduced into the equipment at the level of the module with the temperature nearest to $T_2$ and if possible slightly less than it, and circulates in bundles—also termed cooling bundles—crossing in series the modules in the direction of increasing rank, as far as the module where the temperature is $T_3$ and leaving the equipment at the latter temperature. The first module at temperature $T_0$ is special in that it lacks a compressor and in that the entire flow of the second liquid, in liquid state, arriving in this cell is vaporized. Similarly, the last module at temperature $T_3$ is special in that it lacks any liquid supply and in that the vapor flow of the second fluid arriving in the cell is totally condensed.

Attention is drawn to the fact that because of the characteristics of the equipment as described above, several operational properties are obtained: in the first place, the vapor flow arriving at a module equals the liquid flow leaving it; in the second place, the liquid flow of the second fluid crossing the modules traversed only by the heating bundles in the direction of decreasing rank is progressively vaporized toward the first module, where everything is vaporized; in the third place, the vapor flow of the second fluid traversing the modules crossed only by the cooling bundles in the sense of increasing rank is progressively condensed toward the last module where all of the vapor flow is condensed; in the fourth place, there is no flow of the second fluid, whether vapor or liquid, out of the equipment (that is, this liquid moves in closed circulation); in the fifth place, if there is no overlap between the temperature intervals $(T_0, T_1)$ and $(T_2, T_3)$, the following modules in the sense of increasing rank will comprise in series p modules reheated by the first fluid going from $T_0$ to $T_1$, r modules without heat-transfer bundles, and q modules cooled by the third fluid changing from $T_2$ to $T_3$; in the sixth place, if the temperature intervals $(T_0, T_1)$ and $(T_2, T_3)$ overlap in $(T_1, T_2)$ those modules of which the temperature falls between $T_1$ and $T_2$ comprise both heating and cooling bundles.

Clearly, the invention is not restricted to these particulars.

According to another significant embodiment of the invention temperatures $T_1$ and $T_2$ being considered as those for which there is ordinary operation, a sufficient number of modules with temperatures near $T_1$ and $T_2$ are provided with transfer bundles not crossed by the transfer fluids when in ordinary operation and provided with admission means for the transfer fluids. Therefore, if the input temperatures $T_1$ and $T_2$ of the first or third fluid vary, becoming $T'_1$ and $T'_2$, said fluids may be admitted at the level of those modules where the temperature is nearest $T'_1$ and $T'_2$.

FIG. 1 relates to an equipment of the invention comprising 10 modules A through J and corresponding to the case of no temperature overlap between the first and third fluids. According to this embodiment, cells A, B and C are crossed by the first fluid, which enters at 1 at temperature $T_1$, traversing heating bundles 2 of the three cells in the direction of decreasing rank and which issues at 3. These bundles are at least partially submerged.

Cells F, G, H, I, and J are crossed by the third fluid entering at 4 at temperature $T_2$ and issuing at 5 at temperature $T_3$ after having traversed cooling clusters 6.

The liquid and the vapor of the second fluid coexist in the cells, the vapor flowing in the direction of increasing rank and the liquid in the direction of the decreasing one.

A module comprises a compressor stage 7 of the diagrammatical multi-stage compressor and the cell. For instance, if cell F is considered, the compressor compresses the vapor of the second fluid from cell E and forces it to a temperature level exceeding that of cell F where it partially condenses on the condensation cluster 6 traversed by the third fluid and located outside the liquid. An equal amount of liquid flow returns from cell F to cell E through a conduit 8 to "flash" inside the latter,—that is, to expand abruptly while partly vaporizing in a calibrated orifice 9.

Similarly, cell B comprises a cluster 2 crossed by the first fluid, to enable the vaporization of the second fluid. This amount in addition to the vapor from cell A is fed to the compression stage between B and C. An equal amount of output mass of liquid returns from C to B while flashing. The vapor generated in cell B is caused by the flash effect and by the heating of the liquid by the first fluid circulating in cluster 2.

E represents a cell without a cluster, where the liquid from F is flashed and where the vapor from D is superheated.

Depending on the input temperature of the first fluid, valves 10 allow introducing a suitable temperature in cluster 2 of the cell. Similarly, depending on the input temperature of the third fluid, valves 11 allow the introduction of a suitable temperature in cooling cluster 6 of the cell.

FIG. 2 illustrates the case of overlap between the temperature ranges of the first and third fluids. Cells such as E comprise two clusters, one for heating and possibly partly immersed in the liquid of the second fluid and crossed by the first fluid, and one of condensation located outside the liquid and traversed by the third fluid. The heat transfer between these two clusters thus is achieved directly by evaporation and condensation at the surface of each of these clusters for the vapor present in the cell.

Regarding cell A, it will be observed that the liquid mass flow of the second fluid which is received from cell B equals that released to it in gaseous form through the intermediary of the compressor stage. Therefore the transfers (of mass HJ) between cells B and C and between all adjacent cells are similarly balanced.

Evaporation is caused in cell B because of the action of the first fluid and that of flashing the liquid from C, so that the vapor flow emitted toward C exceeds the incoming one from A. Similar reasonings apply to each cell to lead to the conclusion that the circulation of the second fluid may be analyzed as the superpositions of closed circuits, there being a maximum flow in the central region, as shown in FIG. 3, which shows the liquid flow in solid lines and the vapor flow in dashed ones. Hence it appears that equipment operation may be very simply controlled by acting on the flow between cells, either by means of valves located either at the orifices where the liquid is fed from one cell to another, or in series or parallel with the compressor stages.

I claim:

1. A heat-transfer process for using heat delivered by a first heat-bearing fluid to make a second fluid pass from liquid state to that of saturated vapor, the process comprising the steps of:

causing the first and second fluids to circulate in a series of modules, each module having a compressor stage and a heat-exchanger stage including a first compartment for the first fluid and a second compartment for the second fluid, the second compartment for the second fluid communicating with the high pressure output of the compressor such that there exists in the series of modules a direction of increasing pressure and a direction of decreasing pressure of the second fluid;

causing the first heat-bearing fluid to traverse in series the first compartments of the heat exchangers of the series of modules in the direction of decreasing pressure of the second fluid;

conveying the second fluid in a liquid state from the second compartment of a first module in the series of modules to the second department of an adjacent module of lower pressure;

the second compartment of the heat exchanger of the adjacent module of lower pressure in the series of modules thereby receiving the second fluid in liquid state from the second compartment of the heat exchanger of the first module; and, conveying the second liquid in a gaseous state from the second compartment of the heat exchanger of the first module to the second compartment of the heat exchanger of an adjacent module of higher pressure by traversing the compressor stage of the adjacent module of higher pressure, the second compartment of the heat exchanger of the adjacent module of higher pressure thereby receiving the second fluid in gaseous state from the second compartment of the heat exchanger of the first module.

2. A process according to claim 1, wherein said second fluid is conveyed from an adjacent module to a module of lowest pressure in the series of modules in a liquid state only, and said second fluid is conveyed from said module of lowest pressure to an adjacent module in a gaseous state only, said module of lowest pressure having no compressor stage.

3. Process as defined in claim 1, wherein the totality of the first fluid is introduced into the heat-exchanger of the module in which prevails the temperature nearest to that of the first fluid at the time of introduction.

4. Process as defined in claim 1, wherein the first fluid is hot water, for instance of geothermal origin.

5. Process as defined in claim 1, wherein the flow-rates between two consecutive modules are so controlled that at any instant the mass of the flow of the second fluid transferred in the liquid state between the two modules equals the mass flow of the second fluid in the gaseous stage between the same two modules, through the intermediary of the compressor stage.

6. Process according to claim 1 in which the heat delivered by the first fluid while it is cooled, is transferred at a higher average temperature into a third fluid, using the second fluid as an intermediate heat exchange medium, the first and second fluid being conveyed in a first set of modules, the second and third fluid being conveyed in a second set of modules having exactly the same operation characteristics as the first set, wherein the third fluid in the second set plays the same part as the first fluid in the first set, except that the third fluid traverses the series of modules of the second set in the direction of increasing pressure, and further wherein the module at highest pressure of said second set receives no liquid second fluid and has no gaseous second fluid exhaust, the process being further characterized in that the modules traversed by the first fluid and the modules traversed by the third fluid belong to a unique series of modules in which the first fluid traverses a part of the series in the direction of the decreasing pressures down to the module which is at the lowest pressure, the third fluid traverses a part of the series in the direction of the increasing pressures up to the module which is at the highest pressure and the second fluid is present at both liquid and gaseous states in each module and traverses the whole series at the gaseous state in the direction of increasing pressure and at the liquid state in the direction of the decreasing pressures.

7. Process defined in claim 6, wherein some of the heat-exchangers of the modules of the series comprise three compartments respectively crossed by the three fluids.

8. Process as defined in claim 6, wherein the second fluid crosses modules which are traversed neither by the first nor by the third fluid, located between the modules crossed by the first fluid and those traversed by the third fluid.

9. Process as defined in claim 6, wherein the totality of the third fluid is introduced into the heat-exchanger of that module where the temperature is nearest to that of the third fluid at the time of its introduction.

10. Apparatus for using heat delivered by a first heat-bearing fluid to make a second fluid pass from liquid state to that of saturated vapor, comprising a series of modules, each module in said series including:

one stage of a multi-stage compressor; and a heat exchanger, said heat exchanger including:

a first compartment through which the first fluid traverses as it is conveyed from one module to an adjacent module in the series, and a second compartment for the second fluid, said second compartment being in vapor communication with the high pressure output port of the compressor stage of the module in which the heat exchanger is located and in vapor communication with the low pressure input port of the compressor stage of an adjacent module which is at a higher pressure, and being in liquid communication with two adjacent modules by means of calibrated orifices, thereby establishing in the series of modules a direction of increasing pressure and a direction of decreasing pressure of the second fluid.

11. Apparatus as defined in claim 10, further including a lowest pressure module in said series having no compressor stage and in liquid communication with only an adjacent module of higher pressure by means of calibrated orifices.

12. Apparatus as defined in claim 10, further including a highest pressure module in said series with a compressor stage and a heat exchanger having a second compartment for the second fluid which is in vapor communication only with the high pressure output port of the compressor stage of the highest pressure module and in liquid communication only with the second compartment of an adjacent module of lower pressure.

13. Apparatus as defined in claim 10, further including at least one module in said series having a compressor stage and a heat exchanger with a first compartment through which a third fluid traverses in a direction of increasing pressure and a second compartment for the second fluid.

14. Apparatus as defined in claim 13 further comprising means for introducing the totality of at least one of the first fluid and the third fluid into any of the corresponding compartments of the heat-exchangers.

15. Apparatus as defined in claim 13, further including at least one module in said series having a heat exchanger with a first compartment for the first fluid, a second compartment for the second fluid and a third compartment for the third fluid.

16. Apparatus as defined in claim 13, further including an intermediate module located between the modules in said series through which the first fluid is conveyed and the module through which the third fluid traverses, said intermediate module including a heat exchanger having only a compartment for the second fluid.

17. Apparatus as defined in claim 13, wherein said first compartments for the first fluid and said compartments for the third fluids of said heat exchangers each include at least one conduit, the conduits of the first compartments for the first fluid being immersed in liquid of the second fluid and the conduits of the first compartments for the third fluid being surrounded by vapors of the second fluid.

* * * * *

UNITED STATES PATENT AND TRADEMARK OFFICE
CERTIFICATE OF CORRECTION

PATENT NO. : 4,149,585
DATED : April 17, 1979
INVENTOR(S) : Jacques Sterlini

It is certified that error appears in the above–identified patent and that said Letters Patent are hereby corrected as shown below:

In the claims:

at column 5, line 19, that portion reading:
"department"

should read:
--compartment--;

at column 5, line 26, that portion reading:
"liquid"

should read:
--fluid--.

Signed and Sealed this

Eighth Day of January 1980

[SEAL]

Attest:

SIDNEY A. DIAMOND

Attesting Officer

Commissioner of Patents and Trademarks